May 8, 1956     E. P. COLLIER     2,744,617
FORAGE HARVESTERS

Filed Feb. 17, 1955     3 Sheets-Sheet 1

Inventor
Everett Peter Collier
by Stevens, Davis, Miller & Mosher
his attorneys

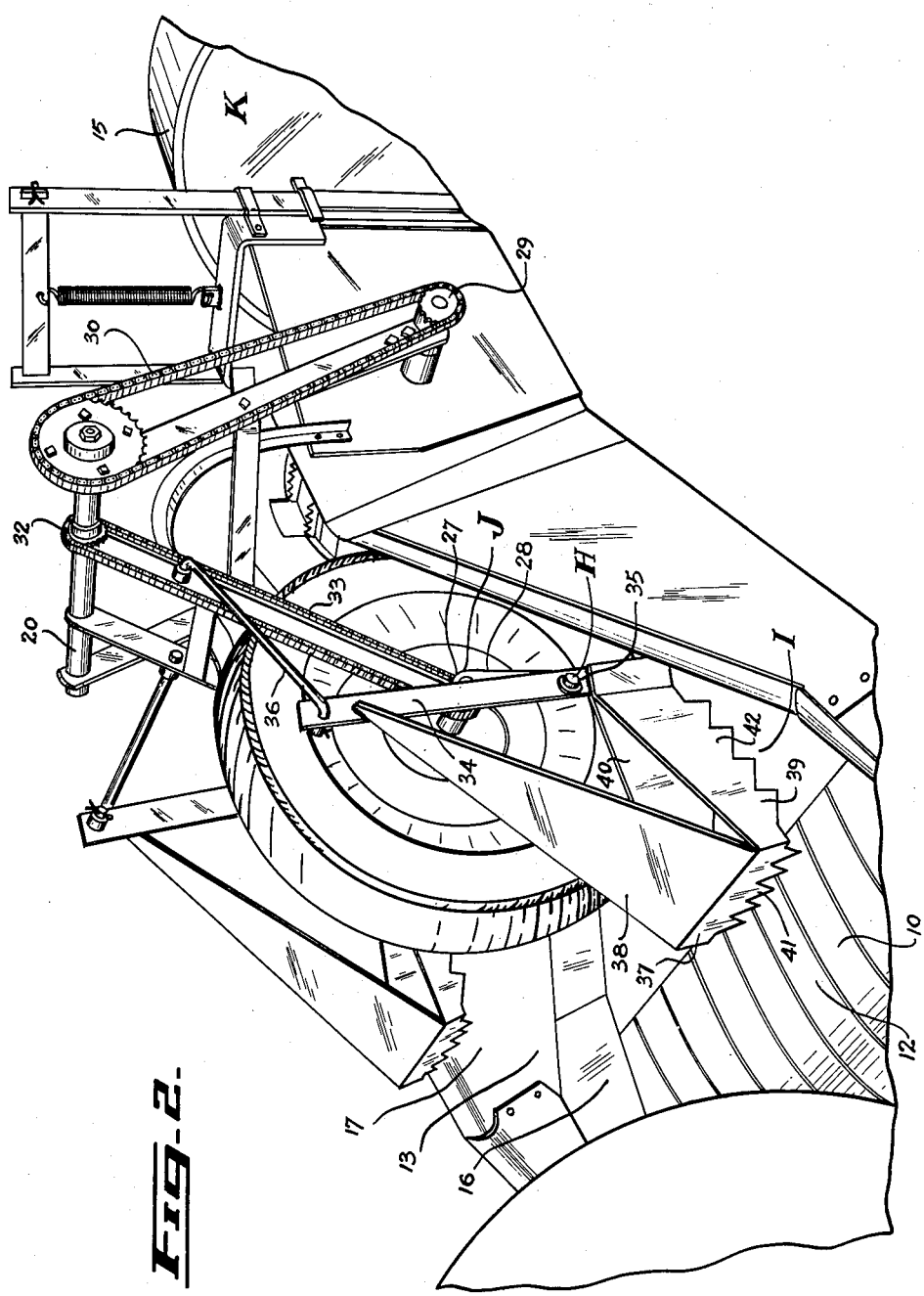

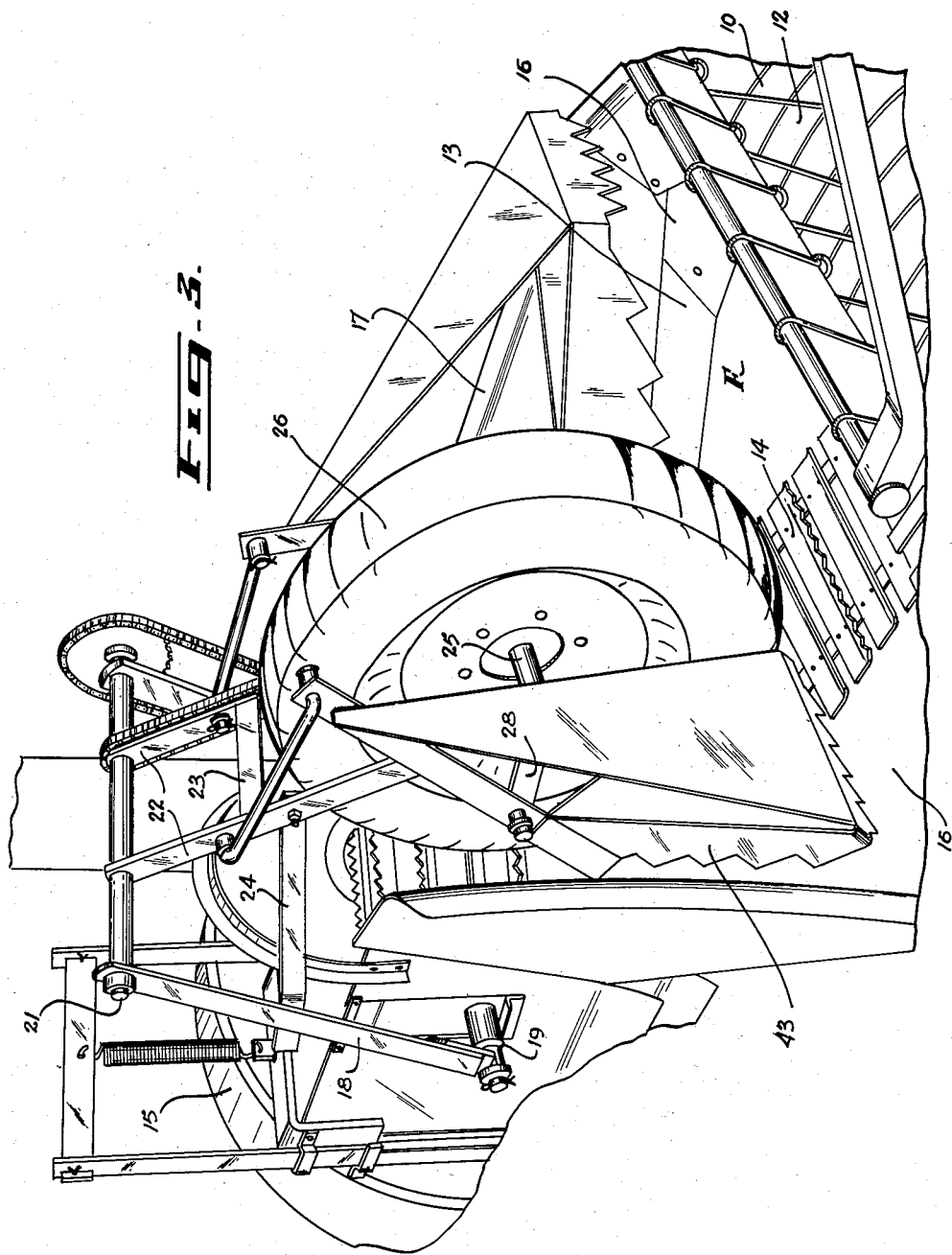

United States Patent Office 2,744,617
Patented May 8, 1956

2,744,617

FORAGE HARVESTERS

Everett P. Collier, Brantford, Ontario, Canada, assignor to Cockshutt Farm Equipment, Limited, Brantford, Ontario, Canada, a corporation of Canada Application February 17, 1955, Serial No. 488,877

9 Claims. (Cl. 198—166)

This invention relates to forage harvesters and more particularly to feeding means for forage harvesters.

Forage harvesters of the type to which this invention relates have pick up means provided for example by feed fingers which are swung to lift cut grass from the ground onto a feed table. The feed table includes a feed conveyor which is narrower than the pickup means to conduct the cut grass to feed rolls and from thence to a suitable cutting means such as an arrangement of rotary or scissor action knives and a feed chute for delivery of the chopped grass. The feed table includes an apron which is preferably triangularly shaped to guide that part of the cut grass which is not picked up directly in alignment with the feed conveyor onto the feed conveyor. The apron is usually sloped downwardly towards the feed conveyor and is preferably provided with side walls to assist the action of the apron in guiding the grass onto the feed conveyor. Forage harvesters of the foregoing type have sometimes been provided with a hold down wheel which is mounted to bear on the cut grass on the feed conveyor. This invention is also applicable to forage harvesters having a direct cutter head. In this case the pick up means together with the forward movement of the harvester act to transfer the cut grass to the feed table as the grass is cut.

It has been found that there is a tendency for the cut grass to lodge on the apron, resulting in a stoppage of the flow of grass and give rise to bunches of grass which become jammed between the rearward portion of the hold down wheel and the sidewalls of the apron causing stoppages and sometimes breakages.

The general object of this invention is to provide an improved feeding means for transferring material from the apron onto the feed conveyor so that the material will be transferred to the feed rolls.

A further object in accordance with one aspect of this invention is to provide feeding means associated with a hold down wheel but in which the rate of action of the feeding means is independent of the rotation of the hold down wheel. This gives increased flexibility of operation as the rate of movement of the feeding means will depend on the desired length of cut. It is advantageous therefore to have the feeding means operable at a separably controllable speed to provide smooth trouble free operation under a variety of conditions.

A further object in accordance with another aspect of this invention is to provide an improved feeding means which is simple in structure and effective and reliable in operation.

Further objects and advantages and the manner in which the foregoing objects are achieved in accordance with this invention will be apparent from the description which follows of the preferred embodiment of this invention and from the appended claims.

In the drawings which illustrate the preferred embodiment of this invention:

Figure 2 is a perspective view similar to Figure 1 but regarded from one side.

Figure 3 is a perspective view similar to Figure 2 but regarded from the other side.

Figure 1:
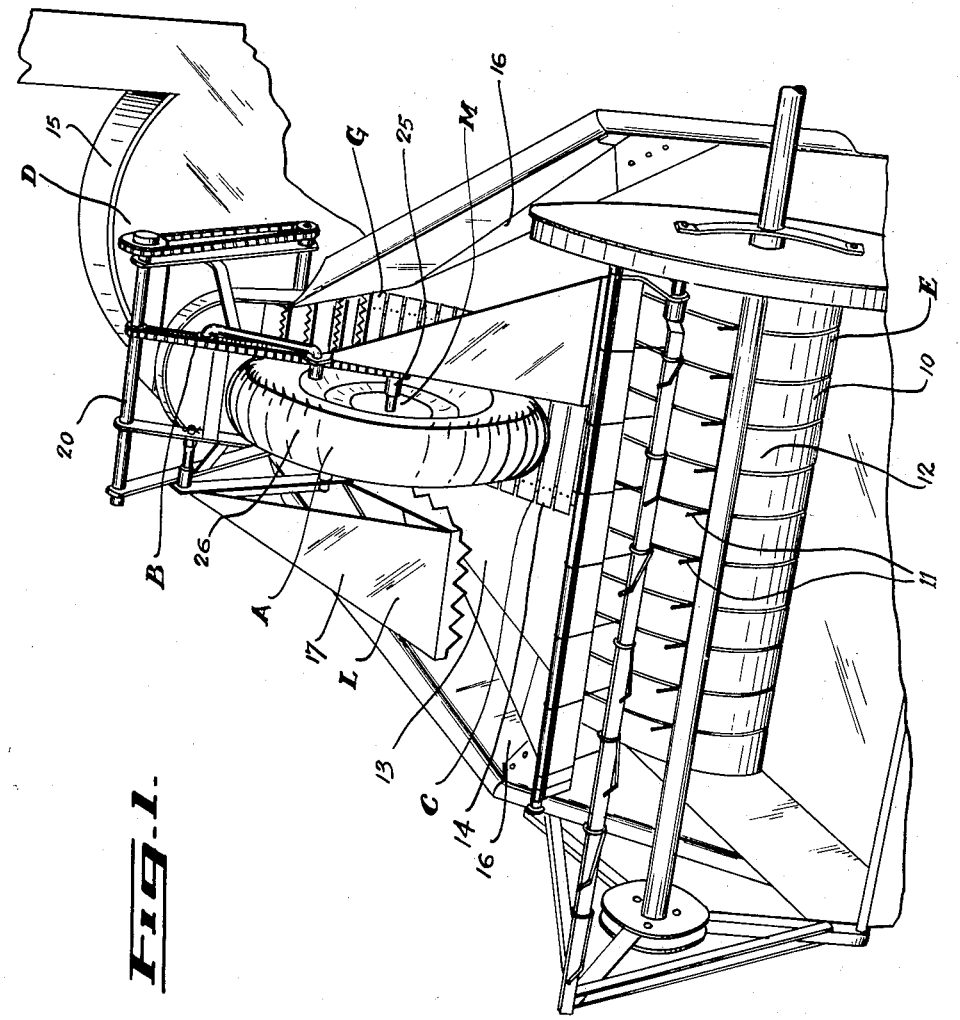
Figure 1 is a perspective view of a harvester in accordance with this invention regarded from the rear.

Referring now to the drawings, the forage harvester shown comprises a pick up means 10 consisting of feed fingers 11 which are swung with a circular movement between stripper sections 12. Feed fingers 11 pick up the cut grass, the term grass being used generically to include hay, straw or other crops, and transfers the grass onto the feed table which is generally designated by the numeral 13.

The feed table 13 includes a rearwardly movable feed conveyor 14 which conveys the grass from pick up means 10 towards cutting and delivery means 15. The cutting and delivery means 15 is not shown in detail as it can consist of any of a number of well known structures. Feed conveyor 14 is narrower than pick up means 10 and triangularly shaped aprons 16 are provided to guide the cut grass from lateral portions of the pick up means onto feed conveyor 14. Aprons 16 are preferably inclined towards feed conveyor 14 and provided with side walls 17 to assist in guiding the cut grass. Although the embodiment illustrated shows an apron on each side of the feed conveyor it will be appreciated that the principles of this invention will also be applicable to a structure in which the feed conveyor is located in alignment with one end of the pick up means and only one apron is used.

A supporting structure is mounted over the feed table. The supporting structure consists of an upright frame member 18 mounted on each of side walls 17 by a pivotal mounting 19, a transverse frame member 20 connected between the upper ends of frame members 18 and enclosing a driving shaft 21, a pair of forwardly and downwardly extending fork forming frame members 22, a transverse stiffening member 23 connected between frame members 22 and supporting struts 24 connected between frame members 18 and 22. Pivotal mounting 19 allows the assembly to float over bunches of grass, rising and falling according to the volume of material. The result is that the hold down wheel controls the height of the feeding means.

A shaft 25 is journalled at the lower ends of fork forming frame members 22. A hold down wheel 26 is mounted for free rotation on shaft 25. The weight of the supporting structure acting about pivotal mountings 19 makes hold down wheel 26 bear on the material on feed conveyor 14. Hold down wheel 26 is thus in frictional engagement with the feed conveyor or with material on the feed conveyor and is therefore rotated by the movement of the feed conveyor.

A sprocket wheel 27 is mounted on shaft 25 and a crank arm 28 is located at each end of shaft 25. Crank arms 28 are preferably at 180° to each other and are driven at a speed which is independent of the rate of speed of the hold down wheel through sprocket wheel 29 which is driven by a suitable source of power (not shown), sprocket chain 30, sprocket wheel 31 which is mounted on shaft 21, sprocket wheel 32 which is also mounted on shaft 21 and sprocket chain 33 which passes around sprocket wheels 32 and 27. Sprocket wheel 31 is mounted on shaft 21 by slip clutch 31a.

An upright member 34 is pivotally connected at 35 to the free end of each of crank arms 28. A connecting link 36 is pivotally joined to the upper end of upright member 34 and to its corresponding fork forming frame member 22. Link 36 preferably extends rearwardly from upright member 34, but the link could also extend forwardly or if a telescopic link were provided, the link could extend vertically.

Material engaging means is mounted on upright member 34 consisting of an integral sheet of metal formed to provide a transverse material engaging portion 37, a connecting portion 38 extending from portion 37 to the upper end of member 34, a rearwardly and angularly extending material engaging portion 39 connecting between the end of portion 37 which is remote from the feed conveyor and the lower end of upright member 34 and a second rearwardly extending material engaging portion 40 which connects between the end of portion 37 which is adjacent to the feed conveyor and the lower end of upright member 34. Downwardly extending material engaging teeth 41, 42 and 43 are formed at the bottoms of material engaging portions 37, 39 and 40 respectively.

Crank arms 28 are driven in a direction such that the material engaging means is moving rearwardly in the direction of movement of the feed conveyor when the material engaging means are at their lowest material engaging position. The feeding means through the operation of the linkages which have been described perform what may be described as a walking action to transfer material from the aprons to the feed conveyor. The particular linkage which has been provided has the effect of tilting upright member 34 forwardly to maintain material engaging portion 37 close to the apron after the crank arm has travelled past its lowest point as best illustrated at the left hand side of Figure 3. When, however, the crank rotates to a position in which it is approaching its lowest point as shown at the right hand side of Figure 3 upright member 34 is tilted rearwardly thereby ensuring that the material engaging means is lifted high enough to engage and dislodge even bunches of material.

There is also particular merit in the structure of the material engaging means. The action of transversely extending material engaging portion 37 is assisted by rearwardly and angularly extending portion 39 which acts to continue the motion imparted to the material by portion 37 which extends, due to its angular direction across the same width as portion 37, and which conforms to the triangular shape of the apron. Material engaging portion 40 extends rearwardly to reinforce the material transferring action of portions 37 and 39 close to the feed conveyor. Material engaging portions 39 and 40 also perform the added function of providing a means for mounting portion 37 on the lower end of upright 24. The material engaging means is simply, inexpensively and conveniently formed from a single sheet of metal.

I claim:

1. In a harvester of the type described having a continuous feed conveyor for transferring material from pick up means towards cutting and delivery means, said feed conveyor being narrower than the said pick up means and having an apron on at least one side of the feed conveyor for guiding part of the material from the pick up means to the feed conveyor, a framework mounted on said harvester above the feed conveyor, a shaft mounted by said framework, means for driving said shaft at a speed independent of the speed of movement of said feed conveyor, a hold down wheel freely mounted on said shaft, adapted to bear on material on the feed conveyor, said hold down wheel being adapted to be driven by the feed conveyor, a crank arm on said at least one side of the feed conveyor connected to the shaft, feeding means supported by the crank arm and actuated by rotation of the crank arm and acting to transfer material on said apron onto said feed conveyor.

2. A harvester as in claim 1 in which the feeding means comprises an upright arm, the lower portion of which is pivotally joined to the end of said crank arm, a link pivotally connected to the upper end of said upright arm and to said frame work, and transversely extending material engaging means mounted on said upright arm, the means for driving the shaft being adapted to rotate the crank in a direction such that the material engaging means engages the material on the apron when the material engaging means is moving in the same direction as the feed conveyor.

3. In a harvester of the type described having a continuous feed conveyor for transferring material from pick up means towards cutting and delivery means, said feed conveyor being narrower than the said pick up means, and having a triangularly shaped apron on each side of the feed conveyor for guiding part of the material from the pick up means to the feed conveyor, a framework mounted on said harvester above the feed conveyor, a shaft mounted by said framework, means for driving said shaft at a speed independent of the speed of movement of said feed conveyor, a hold down wheel freely mounted on said shaft, adapted to bear on material on the feed conveyor, said hold down wheel being adapted to be driven by the feed conveyor, a crank arm at each end of said shaft and feeding means at each end of the shaft supported by the crank arm and actuated by rotation of a crank arm and acting to transfer material on said aprons in the direction of movement of the feed conveyor and onto said feed conveyor.

4. A harvester as claimed in claim 3 in which the framework is pivotally mounted on the harvester to enable the hold down wheel to control the height of the feeding means.

5. In a harvester of the type described having a continuous feed conveyor for transferring material from pick up means towards cutting and delivery means, said feed conveyor being narrower than said pick up means and having a triangularly shaped apron on at least one side of the feed conveyor for guiding part of the material from the pick up means to the feed conveyor, a framework mounted on said harvester above the feed conveyor, a shaft mounted by said framework, a crank arm on said at least one side of the conveyor connected to said shaft, feeding means actuated by rotation of crank arm and acting to transfer material on said apron onto said feed arm comprising an upright arm, the lower portion of which is joined to the end of said crank arm, a link pivotally connected to the upper end of said upright arm and to said framework, and material engaging means including a transversely extending portion mounted on said upright arm and extending forwardly therefrom and means for driving the shaft adapted to rotate the crank in a direction such that the material engaging means engages the material on the apron when the material engaging means is moving in the same direction as the feed conveyor and said material engaging means comprising a transversely extending material engaging portion and a rearwardly extending material engaging portion, said rearwardly extending portion being connected between the end of the transversely extending portion which is remote from the feed conveyor and the lower end of said upright arm and said rearwardly extending portion being angularly inclined to the direction of the movement of the feed conveyor towards the feed conveyor.

6. A harvester as claimed in claim 5 in which the material engaging means integrally formed from sheet metal to provide a transversely extending portion having downwardly extending material engaging teeth, a rearwardly extending portion having downwardly extending material engaging teeth joined to the lower portion of the upright arm and a connecting portion extending from the transversely extending portion rearwardly and upwardly to the upper portion of the upright arm.

7. A harvester as claimed in claim 6 in which the material engaging means includes a second rearwardly extending portion integrally joined to the end of the transversely extending portion which is adjacent to the feed conveyor and being connected to the lower end of said upright arm, said second rearwardly extending portion having downwardly extending material engaging teeth.

8. In a harvester of the type described feeding means for transferring material from an apron forming part of a feed table to a feed conveyor comprising a supporting frame work, an upright member, a rearwardly extending link connecting the upper end of the upright member to the framework, a crank arm pivotally connected to the lower portion of the upright member, material engaging means connected to and forwardly disposed with respect to the upright arm, said upright arm being adapted to be tilted rearwardly when the crank arm is approaching its lowest position to raise the material engaging means and to be tilted forwardly when the crank arm has travelled a short distance past its lowest position to lower the material engaging means, and means to drive said crank arm in a direction such that the material engaging means travels in the direction of movement of the feed conveyor when at its lowest position.

9. In a harvester of the type described having a feed table including a feed conveyor and at least one triangularly shaped apron for guiding material gathered from the ground onto the feed conveyor, feeding means positioned to act on material on said apron to transfer material from the apron onto the feed conveyor comprising material engaging means consisting of a sheet of metal cut and formed to provide a transverse material engaging portion having downwardly projecting teeth, an angularly and rearwardly extending material engaging portion having downwardly projecting teeth, and extending transversely of said apron conforming with the shape of a side of said triangularly shaped apron, extending substantially parallel to said side, and providing supporting means for the transversely extending material engaging portion and a rearwardly extending material engaging portion having downwardly projecting teeth providing additional supporting means for the transverse material engaging portion, and means for imparting to said material engaging portions a vertically circular movement the direction of said circular movement at the lower portion of said circular movement being the same as the direction of movement of the feed conveyor.

References Cited in the file of this patent

UNITED STATES PATENTS

| 1,124,453 | James | Mar. 5, 1913 |
| 2,394,996 | Hill et al. | May 8, 1942 |